June 5, 1928.

W. EBERHARDT

AUTOMOBILE BRAKE

Filed June 7, 1926

1,672,560

INVENTOR
WILLIAM EBERHARDT
BY Arthur L. Slee
ATTY.

Patented June 5, 1928.

1,672,560

UNITED STATES PATENT OFFICE.

WILLIAM EBERHARDT, OF SAN FRANCISCO, CALIFORNIA.

AUTOMOBILE BRAKE.

Application filed June 7, 1926. Serial No. 114,181.

My invention relates to improvements in brakes for automobiles and the like wherein pressure is applied by rolling contact with a brake drum to retard rotation thereof.

The primary object of my invention is to provide an improved brake for automobiles and the like.

Another object is to provide an improved device wherein the braking pressure is obtained through a rolling contact whereby wear is reduced to a minimum and overheating of the brake drum is avoided.

A further object is to provide an improved brake whereby the use of fibrous lining may be avoided.

Another object is to provide an improved device of the character described which may be readily and accurately adjusted and which will require a minimum of care and attention when in service.

A further object is to provide an improved brake which will not burn out and which will not require relining and in which replacement and repair may be quickly and economically accomplished.

A still further object is to provide an improved construction which is simple and positive in its action and which may be readily installed in connection with the ordinary brake drums.

Figure 1:
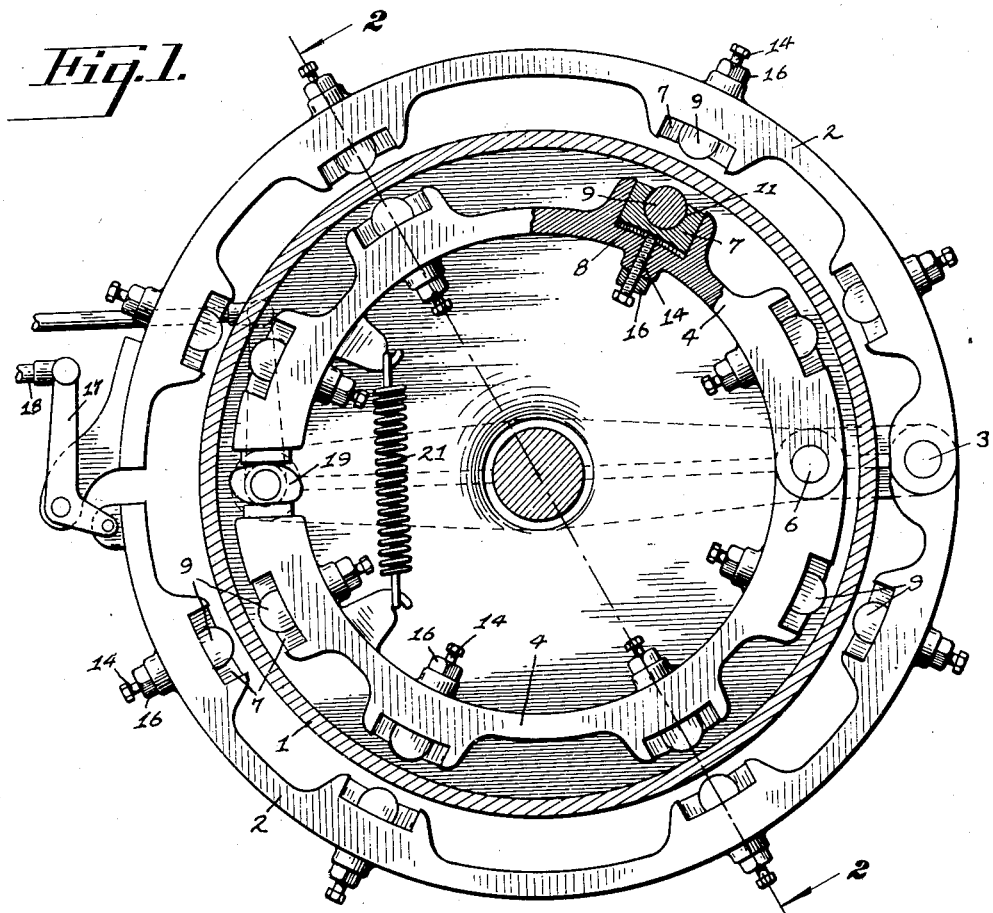
Figure 2:
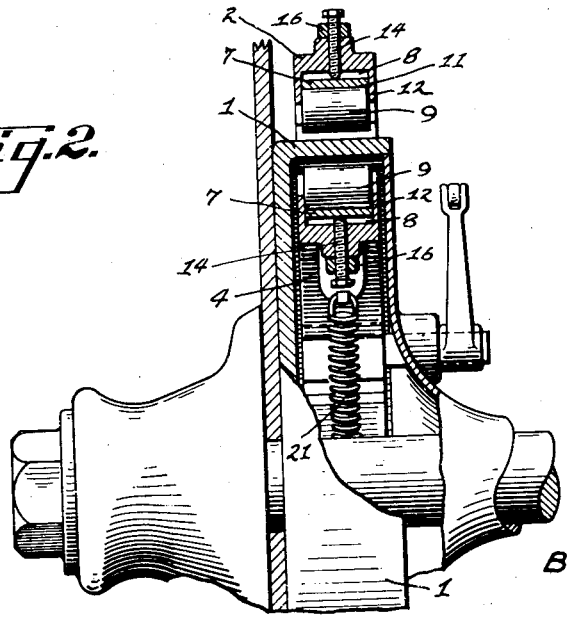

I accomplish these and other objects by means of the improved device disclosed in the drawings forming a part of the present specification wherein like characters of reference, are used to designate similar parts throughout said specification and drawings and in which, Fig. 1 is a side elevation of my improved brake as applied in connection with a brake drum, the brake drum and a portion of one of the band segments being broken away and shown in section, and Fig. 2 is a broken sectional view taken upon the line 2—2 of Fig. 1 in the direction indicated.

Referring to the drawings, the numeral 1 is used to designate in general a brake drum of the character commonly mounted in connection with the wheels of automobiles and the like. An outer band consisting of a pair of segments 2 pivotally connected as at 3 is mounted adjacent the outer surface of the drum. An inner band consisting of segments 4 pivotally connected as at 6 is mounted within the drum adjacent the inner surface thereof.

A plurality of bearing blocks 7 are mounted within recesses 8 formed in the band segments 2 and 4 upon the sides adjacent the drum 1. Cylindrical rollers 9 are rotatably mounted upon the blocks 7, said rollers being engaged within segmental bores 11 extending across the blocks and arranged to permit a side of each roller to project outwardly from the surface of the block to engage the adjacent surface of the drum 1 as hereinafter more fully described. The rollers 9 are inserted into the bores 11 through the ends thereof and when assembled upon the band segments 2 or 4 are retained by flange portions 12 extending across the ends of the recesses 8.

The blocks 7 are slidably movable within the recesses 8 and are frictionally held therein and are engaged by suitable adjusting screws 14 threaded through the band segments and provided with lock nuts 16 whereby the adjusting screws may be locked to maintain a desired adjustment of the blocks 7 relative to the band segments 2 or 4, and to maintain a desired normal clearance between the rollers 9 and the adjacent surfaces of the drum 1.

The outer band segments 2 are arranged to be contracted to press the rollers 9 carried thereby against the outer surface of the drum by means of a member 17 actuated by a brake rod 18 to draw the free ends of the bands together in the well known manner. The inner segments 4 are arranged to be expanded to press the rollers 9 carried thereby against the inner surface of the drum by means of a cam 19 arranged to force the free ends of the band segments apart in the ordinary manner, the segments being normally held in inoperative position with the rollers out of engagement with the drum by means of a spring 21.

In operation, the band segments are contracted or expanded against the drum to exert a braking pressure thereagainst in the ordinary manner. When so contracted or expanded the rollers 9 are pressed against the adjacent surface of the drum to form a rolling contact therewith, said rollers being rotated within the bearing blocks 7 by the rotation of the drum. The rolling pressure thus applied to the drum operates to retard rotation of said drum and thus obtain the desired braking effect without overheating the drum and without causing excessive wear. The blocks 7 and rollers 9 are adjusted by means of the set screws 14 so that the several rollers will engage the drum simultaneously and apply substantially equal pressures thereon, thus equalizing and distributing the load evenly upon the brake bands, the amount of pressure applied upon the drum and the degree to which rotation is retarded being dependent of course upon the force which is applied to contract or expand the bands against the drum. In applying the brakes a gradually increasing pressure is applied by the rollers and the danger of a sudden binding is substantially avoided.

My improved brake, above described, renders unnecessary the use of fibrous brake lining of the character heretofore commonly used, thus obviating the danger of burning out the brakes and rendering the same inoperative and avoiding the need of periodically relining the brakes. In my device substantially all wear is absorbed by the bearing blocks 7 and is so distributed that the brakes may be used for long periods without care or adjustment. If, after long usage the blocks become appreciably worn, the blocks may be readily removed and replaced by new ones at a nominal cost.

The specific form and construction of my improved brake may of course be modified in numerous ways without departing from the spirit of my invention. I therefore do not wish to restrict myself to the specific details of construction illustrated and described, but desire to avail myself of all modifications which may fall within the scope of the appended claims.

Having thus described my invention what I claim as new and desire to secure by Letters Patent is:

1. A brake for automobiles and the like comprising a drum; a pair of bands formed from pivotally movable segments mounted adjacent the inner and outer surfaces of the drum and arranged to apply a braking pressure against the drum; a plurality of bearing blocks adjustably mounted upon the band segments adjacent the drum surfaces; and rollers rotatably mounted upon the blocks and arranged to engage the adjacent drum surfaces to form a rolling contact therewith whereby rotation of said drum may be retarded.

2. A brake for automobiles and the like comprising a drum; a pair of bands formed from pivotally movable segments mounted adjacent the inner and outer surfaces of the drum and arranged to apply a braking pressure against the drum; a plurality of bearing blocks adjustably mounted upon the band segments adjacent the drum surfaces; rollers rotatably mounted upon the blocks and arranged to engage the adjacent surfaces of the drum to form a rolling contact therewith; and means for moving the bands to press the rollers against the drum whereby rotation of said drum may be retarded.

In witness whereof, I hereunto set my signature.

WILLIAM EBERHARDT.